(12) United States Patent
Nguyen et al.

(10) Patent No.: US 11,548,782 B1
(45) Date of Patent: Jan. 10, 2023

(54) USING CONVERTED HYDROGEN AND SOLID CARBON FROM CAPTURED METHANE TO POWER WELLBORE EQUIPMENT

(71) Applicant: Halliburton Energy Services, Inc., Houston, TX (US)

(72) Inventors: Philip D Nguyen, Houston, TX (US); Ronald Glen Dusterhoft, Houston, TX (US); Brian Alan Evans, Houston, TX (US); Stanley Vernon Stephenson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/809,387

(22) Filed: Jun. 28, 2022

(51) Int. Cl.
| | |
|---|---|
| *C01B 3/26* | (2006.01) |
| *C01B 32/05* | (2017.01) |
| *H01M 8/0612* | (2016.01) |
| *H01M 4/96* | (2006.01) |
| *B01J 8/08* | (2006.01) |
| *E21B 41/00* | (2006.01) |
| *B01J 8/10* | (2006.01) |

(52) U.S. Cl.
CPC .............. *C01B 3/26* (2013.01); *B01J 8/085* (2013.01); *B01J 8/10* (2013.01); *C01B 32/05* (2017.08); *E21B 41/00* (2013.01); *H01M 4/96* (2013.01); *H01M 8/0612* (2013.01); *C01B 2203/0277* (2013.01); *C01B 2203/066* (2013.01); *C01B 2203/1241* (2013.01); *H01M 2250/10* (2013.01)

(58) Field of Classification Search
CPC ... C01B 3/26; C01B 32/05; C01B 2203/0277; C01B 2203/066; C01B 2203/1241; B01J 8/10; H01M 4/96; H01M 8/0612
See application file for complete search history.

(56) References Cited

U.S. PATENT DOCUMENTS

| 555,511 A | 3/1896 | Jacques | |
|---|---|---|---|
| 5,650,132 A * | 7/1997 | Murata | ............... C01B 3/26 423/445 B |
| 6,200,697 B1 | 3/2001 | Pesavento | |

(Continued)

FOREIGN PATENT DOCUMENTS

| WO | 2006/050335 A2 | 5/2006 |
|---|---|---|
| WO | 2020/223489 A1 | 11/2020 |
| WO | 2021/077164 A1 | 4/2021 |

*Primary Examiner* — Matthew J Merkling
(74) *Attorney, Agent, or Firm* — Sheri Higgins; Sheri Higgins Law, PLLC

(57) ABSTRACT

Green hydrogen and solid carbon can be produced by reacting captured methane with a catalyst in a reaction chamber. A liquid base fluid can form a continuous phase within the reaction chamber with a plurality of liquid metal carrier droplets dispersed in the base fluid. The catalyst can be nano-sized particles that can coat the surfaces of the carrier droplets. Agitation can be supplied to the reaction chamber to maintain dispersion of the liquid metal carrier droplets and increase contact of the methane and catalyst particles. The reaction temperature can be less than the temperature required for water electrolysis or steam methane reforming processes. The green hydrogen and solid carbon can be used as a power source for wellsite equipment in the form of fuel cells to generate electricity or power or used to charge batteries.

20 Claims, 1 Drawing Sheet

(56) References Cited

U.S. PATENT DOCUMENTS

| | | | |
|---|---|---|---|
| 7,794,690 B2 | 9/2010 | Abatzoglou et al. | |
| 7,799,472 B2 | 9/2010 | Gür | |
| 8,138,380 B2 | 3/2012 | Olah et al. | |
| 8,212,088 B2 | 7/2012 | Olah et al. | |
| 8,679,444 B2 | 3/2014 | Noyes | |
| 9,221,685 B2 | 12/2015 | Noyes | |
| 9,564,650 B2 | 2/2017 | Harjes et al. | |
| 9,783,416 B2 | 10/2017 | Noyes | |
| 10,047,446 B2 | 8/2018 | Kaczur et al. | |
| 10,577,910 B2 | 3/2020 | Stephenson | |
| 11,131,028 B2 | 9/2021 | Kaczur et al. | |
| 11,198,923 B2 | 12/2021 | Giri et al. | |
| 2010/0038082 A1* | 2/2010 | Zubrin | E21B 43/164 |
| | | | 422/187 |
| 2014/0242493 A1* | 8/2014 | Irvine | H01M 50/183 |
| | | | 429/479 |
| 2021/0061654 A1* | 3/2021 | McFarland | B01J 23/89 |

\* cited by examiner

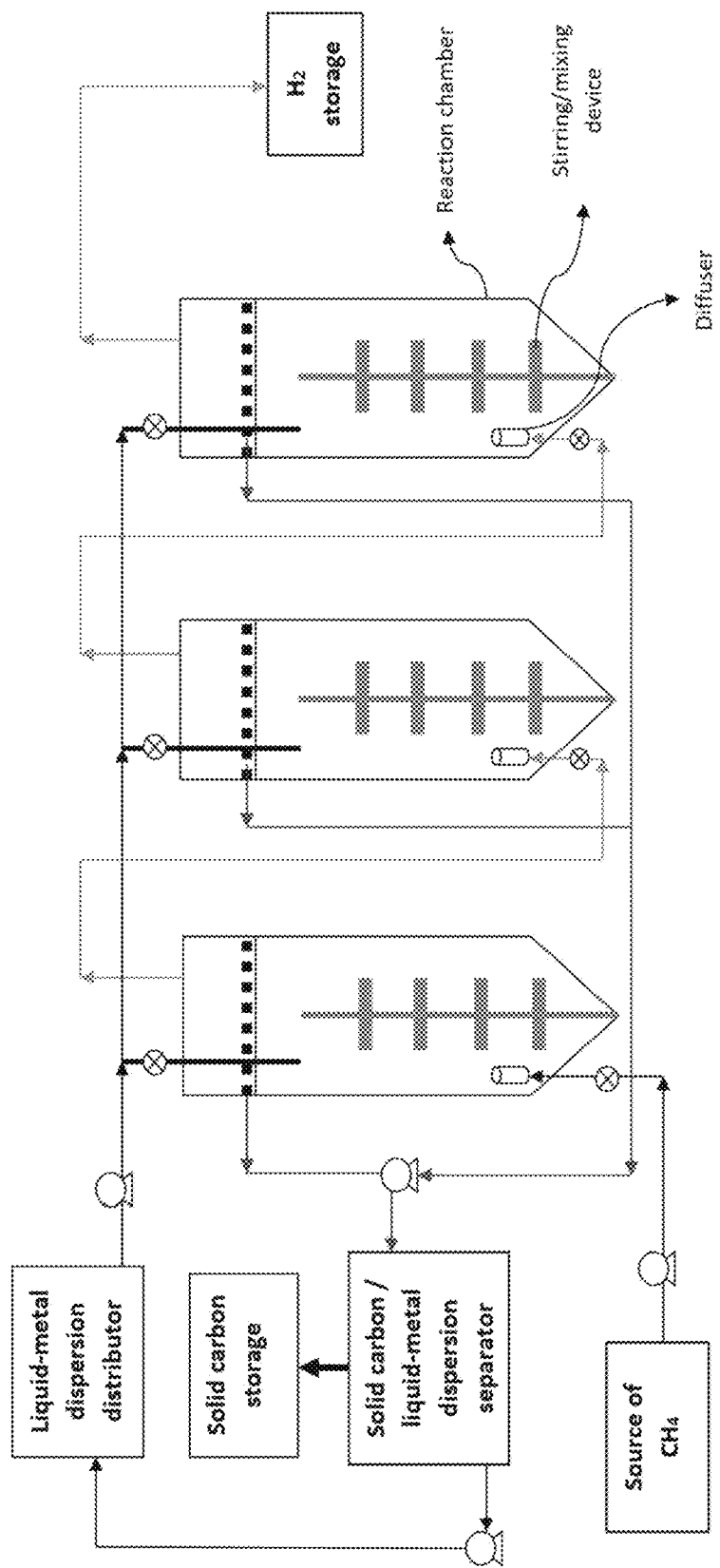

USING CONVERTED HYDROGEN AND SOLID CARBON FROM CAPTURED METHANE TO POWER WELLBORE EQUIPMENT

TECHNICAL FIELD

Captured methane can be converted into hydrogen gas and solid carbon. The hydrogen gas is green hydrogen because no carbon dioxide or carbon monoxide is produced during the conversion process.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 1 is a schematic illustration of reaction chambers for converting captured methane into hydrogen gas and solid carbon according to certain embodiments.

DETAILED DESCRIPTION

Methane gas ($CH_4$) is released into the atmosphere by a variety of processes. One example is during oil and gas operations in which methane gas (hereinafter referred to as "methane") can be released from a wellhead. Landfills also produce methane and carbon dioxide when bacteria break down organic waste. It is estimated that landfills in the United States release over 100 million metric tons of carbon dioxide equivalent ($MMTCO_2e$) of methane into the atmosphere in 2020. Methane is also produced on cattle and dairy farms mainly through enteric fermentation and manure storage. Ruminant livestock (e.g., cattle, sheep, buffalo, goats, deer and camels) have a fore-stomach (or rumen) containing microbes called methanogens, which are capable of digesting coarse plant material, and which produce methane as a by-product of digestion known as enteric fermentation. The methane is released into the atmosphere by the animal belching. It is estimated that cattle produce 212 $MMTCO_2e$ of methane each year in the United States. Moreover, even though methane is a greenhouse gas, it is also widely used in residential and industrial applications to generate heat and electricity by processes that generate and emit carbon dioxide.

Fuel cells can be used as a source of power. A fuel cell is an electrochemical device that converts the chemical energy from a gas (most often hydrogen) and an oxidizing agent (most often oxygen) into electricity through a pair of redox chemical reactions. Methane fuel cells utilize methane as the gas to react with oxygen. The operating temperature of methane fuel cells is in the range of 750 to 1,000° C. While improvements have been made to reduce the operating temperature of methane fuel cells, the methane fuel cells today, even with the availability of new catalysts, still require operating temperatures above 500° C. There are several disadvantages of methane fuel cells including, system complexity introduced by the requirement for carbon dioxide recycling, a corrosive molten electrolyte is required, and the cell materials can be expensive. Accordingly, hydrogen gas is the preferred gas for fuel cells.

Hydrogen gas ($H_2$) (hereinafter referred to as "hydrogen") can be generated to provide a source of power. For example, hydrogen can transport renewable energy when converted into a carrier, such as ammonia, can be a zero-carbon fuel for shipping, or be used with fuel cells to power anything that uses electricity, such as electric vehicles and electronic devices. The type of process used to generate hydrogen can be categorized by hydrogen color codes. By way of example, green hydrogen is produced through a water electrolysis process. Water electrolysis is a process by which electricity is used to decompose water into hydrogen and oxygen. A direct current electrical power source is connected to two electrodes, or two plates (typically made from an inert metal such as platinum or iridium) which are placed in the water. Hydrogen will appear at the cathode (where electrons enter the water), and oxygen will appear at the anode. Assuming ideal faradaic efficiency, the amount of hydrogen generated is twice the amount of oxygen, and both are proportional to the total electrical charge conducted by the solution. Electrolysis of pure water requires excess energy in the form of overpotential to overcome various activation barriers. Without the excess energy, the electrolysis of pure water occurs very slowly or not at all. Because carbon dioxide is not a by-product of electrolysis, the hydrogen generated is coded as "green hydrogen." However, because water electrolysis is very inefficient, approximately less than 4% of the global hydrogen generated is produced by this method.

By way of another example, hydrogen can be generated by a process called steam methane reforming (SMR). Natural gas, such as methane, can be fed into a reactor along with steam and contact a catalyst to react to form hydrogen, carbon dioxide ($CO_2$), and carbon monoxide (CO). SMR requires extremely high operating temperatures in the range of 800 to 900° C. to break the hydrogen bonds of the methane, and also relies on expensive, exotic materials as the catalyst. If the $CO_2$ and CO by-products from SMR are captured and stored underground, then the produced hydrogen is coded as "blue hydrogen." If the $CO_2$ and CO are not captured and stored underground, then the produced hydrogen is coded as "gray hydrogen." Approximately 95% of all hydrogen in the United States and 50% globally is generated today by a steam methane reforming process. In an effort to decarbonize hydrogen production, carbon capture and storage (CCS) methods are being implemented within the industry, which have the potential to remove up to 90% of $CO_2$ produced from the SMR process.

However, there are several disadvantages to SMR. First, SMR produces approximately 7 kilograms (kg) of $CO_2$ per 1 kg of hydrogen produced and accounts for about 3% of global industrial sector $CO_2$ emissions. Second, SMR requires such high reactor temperatures that several safety issues are present. Third, SMR can be very expensive— ranging from $1 to over $3 per kilogram of hydrogen produced. Lastly, despite CCS efforts to capture and store the carbon dioxide by-product, the implementation of this technology remains problematic, costly, and increases the price of the produced hydrogen significantly. Thus, there is a long-felt need for improved processes that generate green hydrogen.

It has been discovered that captured methane can be converted into green hydrogen and solid carbon at lower temperatures and a higher efficiency than steam methane reforming and water electrolysis.

A method of supplying power to wellsite equipment can include: (1) obtaining green hydrogen gas, solid carbon, or green hydrogen gas and solid carbon produced by: (A) introducing captured methane into a reaction chamber; (B) agitating a liquid base fluid, a plurality of carrier droplets, and a catalyst in the reaction chamber; (C) allowing the captured methane to react with the catalyst in the reaction chamber to form the green hydrogen gas and solid carbon;

(D) removing the green hydrogen gas from the reaction chamber; and (E) removing the solid carbon from the reaction chamber, wherein no carbon dioxide is produced as a by-product of the reaction of the captured methane and the catalyst; and (2) using the green hydrogen gas, the solid carbon, or the green hydrogen gas and the solid carbon to power the wellsite equipment.

The methane is captured methane. Captured methane is captured from a methane source before it is released into the atmosphere. The methane can be captured from a variety of locations. Methane can be captured from produced gas during oil or gas production operations from subterranean formations. The methane can also be captured from cattle and dairy farms. The methane can also be captured from landfills. The methane can be captured into a variety of receptacles, such as pipes, storage tanks, or membranes. According to any of the embodiments, the gas introduced into the reaction chamber is 100% methane. The methods can further comprise separating methane from other gases or solid particulates if the captured fluid is not pure methane. The separation of methane can include flowing the captured fluid through a membrane. The membrane can selectively retain other gases or solid particulates and allow methane to pass through the membrane. In this manner, only captured methane is introduced into the reaction chamber.

A system for converting captured methane into green hydrogen gas and solid carbon can include a reaction chamber. The reaction chamber can include a chamber and a fluid inlet. As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. The fluid inlet can be located near a bottom of the chamber. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a heterogeneous fluid. The captured methane can be introduced into the chamber of the reaction chamber via the fluid inlet.

The captured methane reacts with a catalyst to form hydrogen gas and solid carbon. The catalyst can break the carbon-hydrogen bonds of the methane to produce hydrogen gas and solid carbon as shown in Eq. 1 below. The catalyst can be a metal, a metal alloy, or a metal salt. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin. As used herein, the term "metal" means any substance that comprises a metal and includes pure metals and metal alloys.

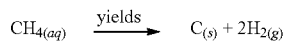

Eq. 1

The catalyst can be a pure metal or metal alloy selected from the group consisting of copper, nickel, cobalt, iron, manganese, chromium, vanadium, palladium, platinum, gold, silver, ruthenium, rhodium, iridium, and combinations thereof. A catalyst metal alloy can also include any of the aforementioned metals alloyed with a non-metal. The catalyst can also be a salt of any of the aforementioned metals. The metal salt can be selected from the group consisting of a metal chloride, metal fluoride, metal bromide, metal iodide, metal nitrate, metal triflate, and combinations thereof. By way of example, the metal of the metal salt is a silver salt. According to any of the embodiments, the catalyst is a metal salt selected from the group consisting of silver chloride, silver fluoride, silver bromide, silver iodide, silver triflate, and combinations thereof. The metal of the catalyst can be a post-transition metal. The post-transition metal can be selected from the group consisting of aluminum, gallium, indium, thallium, tin, bismuth, and combinations thereof. The post-transition metal can be alloyed with an alkali metal, alkaline earth metal, actinide metal, lanthanide metal, transition metal, or combinations thereof.

The catalyst can be a solid. The catalyst can be plurality of solid particles. The catalyst can have a mean particle size less than 10 micrometers. The catalyst can have a mean particle size in the range of 10 to 100 nanometers (0.01 to 1 micrometers). The mean particle size of the catalyst can be selected such that an increased surface area is available for reacting with the captured methane.

The system also includes a plurality of carrier droplets. The carrier droplets can comprise a metal. As used herein, the term "droplet" means a very small drop of liquid. The metal can be in liquid form. The metal for the carrier droplets can be selected from post-transition metal. The metal for the carrier droplets can be selected from the group consisting of aluminum, gallium, indium, thallium, tin, bismuth, and combinations thereof. The post-transition metal can also be alloyed with an alkali metal, alkaline earth metal, actinide metal, lanthanide metal, transition metal, or combinations thereof. The plurality of carrier droplets can have a mean diameter less than 100 micrometers. The plurality of carrier droplets can have a mean diameter in the range of 0.1 to 50 micrometers. It is to be understood that the use of the term droplet does not limit the liquid droplets to any particular shape (e.g., spherical) or require each droplet to have uniform dimensions. Moreover, any uniform dimensions and shape can also change during agitation in the reaction chamber.

The plurality of carrier droplets can be a metal that has a melting point below 300° C., 200° C., 150° C., 100° C., or 60° C. According to any of the embodiments, the metal of the plurality of carrier droplets has a melting point less than or equal to ambient temperature (~75° F. (24° C.)). By way of example, pure gallium has a melting point of about 30° C. and alloys of gallium with other metals can have a melting point close to 24° C.

The system can also include a liquid base fluid. The liquid base fluid can form a continuous phase within the reaction chamber wherein the plurality of carrier droplets, the catalyst, and the captured methane can be a dispersed phase within the liquid base fluid. According to any of the embodiments, the liquid base fluid does not solubilize or negligibly solubilizes the catalyst solid particles or the plurality of carrier droplets. According to any of the embodiments, the liquid base fluid is not consumed by, nor takes part in, the reaction of the catalyst and the captured methane. The liquid base fluid can be, for example, an ionic liquid or an organic liquid. Examples of ionic liquids include 1-alkyl-3-methyl-imidazolium, 1-alkyl-1-pyrrolidinium, 1-alkylpyridinium, trialkylsulfonium, n-alkylphosphonium, tetraalkylammonium, tetraalkylphosphonium, dicyanamide, acetate, halogen, trifluoroacetate, hexafluorophosphate, tetrafluoroborate, alkyl sulfonate, alkyl sulfate, alkyl phosphate, bis(trifluoromethylsulfonyl)imide, and combinations thereof. Examples of organic liquids include alkanolamines, dimethylformamide, acetonitrile, cyclohexane, diethylene glycol dimethyl ether, ethylene glycol, glycerol, 2-amino-2-methyl-1-propanol, benzylamine, piperazine, 1,2-ethanediamine, 3-methylamine propylamine, pyridine, triethylamine, xylene, propanol, butanol, ethanol, methanol, acetone, methyl acetate, acetylacetone, 1,4-dioxane, 2-methoxyethyl acetate, N,N-dimethylacetamide, 2-butoxyethyl acetate, N-tert-butylformamide, 2-(2-butoxyethoxy)ethyl acetate, formamide, poly(ethylene glycol), carbonate (such as sodium, potassium or calcium carbonate), bicarbonate (such as sodium or potassium bicarbonate etc.). The liquid base fluid can also be water or mixture of any two or more of disclosed liquids. The liquid base fluid is preferably a non-polar solvent since methane gas is a non-polar fluid. A non-polar liquid base solvent enhances the solubility of methane gas in the liquid base fluid. Some examples of non-polar solvents include alkanes, chloroform, carbon tetrachloride, diethyl ether, toluene, xylene, and 1,4-dioxane.

One or more surfactants can also be included. The surfactant can enhance dispersion of the plurality of carrier droplets throughout the liquid base fluid. The surfactant can be anionic, cationic, or non-ionic.

The catalyst, the plurality of carrier droplets, and the liquid base fluid can be added to the chamber of the reaction chamber at the same time or different times. By way of example, the liquid base fluid, the catalyst particles, and the liquid metal carrier droplets can be pre-mixed in a separate container to allow the liquid metal to form a dispersion of fine droplets suspended in the liquid base fluid, and then this dispersion can be added to the chamber of the reaction chamber.

The methods include agitating the liquid base fluid, plurality of carrier droplets, and the catalyst in the reaction chamber. Any form of mechanical agitation can be applied to the contents in the reaction chamber to ensure dispersion of the liquid metal carrier into fine droplets in the liquid base fluid. Examples of mechanical agitation include, but are not limited to, sonication, vibration, homogenization, rapid stirring, blending, or mixing. The system can also include an agitator, for example a motor and one or more mixing blades, to agitate the contents in the reaction chamber.

The plurality of carrier droplets can be a carrier for the catalyst particles. The catalyst particles can have an affinity for the plurality of carrier droplets and can coat the outside of the droplets and also become intermixed within the droplets. The amount of agitation of the contents in the reaction chamber can be selected such that the liquid metal carrier droplets have desired dimensions. By way of example, increased agitation can produce droplets having smaller dimensions than lower agitation. The dimensions of the droplets and the concentration of the liquid metal carrier can provide a desired surface area of the plurality of carrier droplets, which increases the surface area of the catalyst particles that react with the captured methane. The liquid base fluid or solvent can help disperse the liquid metal carrier droplets with the help of mechanical agitation. The catalyst particles are dispersed in the liquid metal carrier droplets. The liquid metal carrier droplets can prevent coking or coating of solid carbon (produced from methane reduction) on the catalyst nanoparticles and the liquid metal droplets themselves, thereby allowing fresh surfaces of catalyst particles to react with the methane dissolved in the liquid base solvent. The small size of the droplets provides large surface areas for the catalytic sites between the catalyst particulates and methane. The low density of produced solid carbon and the smooth surface of liquid metal droplets enhance detachment of produced solid carbon from the liquid metal droplets, allowing it to float to the top of the reaction chamber to be separated and collected.

The methods include allowing the captured methane to react with the catalyst in the reaction chamber to form hydrogen gas and solid carbon. The solid carbon can be in the form of particulates. The solid carbon can float to the top of the liquid base fluid in the reaction chamber.

According to any of the embodiments, the mechanical agitation is continuously applied to the contents in the reaction chamber during the reaction time (i.e., the length of time that the captured methane is in contact with liquid metal carrier droplets and the catalyst particles). Continuous agitation can be used to keep the liquid metal carrier as a plurality of droplets in the dispersion, prevent the plurality of carrier droplets from coalescing, enhance detachment of the solid carbon particulates from the surfaces of the plurality of carrier droplets, and cause the solid carbon to float to the top of the liquid base fluid in the reaction chamber.

The captured methane can be introduced into the bottom of the reaction chamber via an inlet (discussed above). The inlet can include a diffuser that causes the captured methane to enter the reaction chamber as bubbles. Bubbled methane can more easily react with the catalyst on the plurality of carrier droplets as the methane rises to the top of the reaction chamber. The inlet can include one or more components that can control the flow rate and amount of the captured methane that is being introduced into the reaction chamber. There can also be more than one inlet that is used to introduce the captured methane into the reaction chamber. The inner diameter of the one or more inlets can be selected such that a desired flow rate of the captured methane into the reaction chamber can be achieved.

As shown in FIG. 1, the reaction chamber can also include a first outlet. The first outlet can be located adjacent to the surface of the liquid base fluid. The methods include removing the solid carbon from the reaction chamber. The solid carbon can be removed by drawing a top portion of the liquid base fluid, carrier droplets, catalyst, solid carbon mixture into the first outlet. It is to be understood that some or all of the following may be located at the surface of the liquid within the chamber: the liquid base fluid, the surfactant if used, a portion of the liquid metal carrier droplets, the catalyst particles, and the solid carbon. Accordingly, only the liquid base fluid and the solid carbon may be located at the surface of the liquid in some instances, while in other instances a portion of the liquid metal carrier droplets can also be located at the surface. The solid carbon can be separated from the liquid base fluid and liquid metal carrier droplets and catalyst in a separator after being removed from the reaction chamber. The solid carbon can then be stored in a storage vessel.

The reaction chamber can also include a second outlet. The second outlet can be located at the top of the chamber. The produced hydrogen gas and any unreacted methane can be located at the top of the chamber and can be withdrawn from the reaction chamber via the second outlet.

According to any of the embodiments, one reaction chamber is used in the system. According to these embodiments, any or all of the following can be modified to achieve a desired efficiency of converting the captured methane to hydrogen gas and solid carbon: the dimensions of the reaction chamber, the concentration of the liquid base fluid, the concentration of the plurality of carrier droplets, the concentration of the catalyst, the flow rate of the captured methane into the reaction chamber, and the type, duration, and force of the mechanical agitation. The desired efficiency can range from 50% to 90%.

As can be seen in FIG. 1, there can be more than one reaction chamber connected in series. According to these embodiments, the captured methane can be bubbled up through a first reaction chamber. After the desired reaction time, the top portion of liquid base fluid, solid carbon, liquid metal carrier, catalyst, or combinations thereof can be removed from the first reaction chamber via a first outlet. The produced hydrogen gas and any unreacted methane can be removed from the reaction chamber via the second outlet. The solid carbon can be separated from the liquid base fluid, liquid metal carrier, and/or catalyst via a separator and then stored in a carbon storage vessel. The liquid base fluid, liquid metal carrier, and/or catalyst that has been separated from the solid carbon can then be introduced into the first reaction chamber or other reaction chambers via an inlet. The hydrogen gas and unreacted methane can then be flowed from the first reaction chamber into a second reaction chamber via an inlet located at the bottom of the second reaction chamber. The second reaction chamber can include the liquid base fluid, plurality of carrier droplets, and catalyst particles. The process used in the first reaction chamber for reacting methane with the catalyst can be used in the second reaction chamber, a third reaction chamber, and so on. Each of the additional reaction chambers can have the same components (e.g., inlet, outlets, agitator, etc.) as the first reaction chamber. In this manner, the desired efficiency of converting the captured methane to hydrogen gas and solid carbon can be achieved. The hydrogen gas can be stored in a hydrogen storage vessel.

According to any of the embodiments, the catalyst is not used up during the reaction with the captured methane. However, some of the catalyst particles may need to replenish the catalyst particles remaining in the reaction chamber. For example, full recovery of the catalyst particles from the solid carbon/liquid metal carrier separator may not be possible. Therefore, the concentration of the catalyst particles may become diminished, and the desired efficiency may not be achieved.

The temperature of the liquid base fluid is preferably greater than or equal to the melting point of the metal of the carrier droplets. In this manner, the carrier droplets can remain in liquid form for the duration of the reaction time. The system can further include a heat source for increasing the temperature of the liquid base fluid above the melting point of the metal carrier droplets. The heat source can be, for example, exhaust gas from equipment, a heating jacket placed wholly or partially around the reaction chamber, coils located around the outside of the reaction chamber in which a heated fluid can be flowed through, or heat produced from fuel cells—which advantageously utilizes green energy to heat the liquid base fluid.

The methods can further include using the produced hydrogen and/or the solid carbon in oil and gas operations. The produced hydrogen can be used as a fuel in internal combustion engines. The produced green hydrogen gas can be used as a power source in hydrogen fuel cells to produce electricity for wellsite equipment. The electricity produced from the hydrogen fuel cells can also be used in charging the batteries that can be delivered to well sites to power wellbore equipment. As used herein, "wellbore equipment" means any equipment, tool, etc. that requires a source of power to operate and is used in oil or gas operations. Wellsite equipment includes equipment located above ground at or near the wellsite and below ground within or adjacent to a wellbore. According to any of the embodiments, the wellsite equipment is equipment used in hydraulic fracturing operations, drilling operations, or cementing operations. The wellbore equipment can also be submersible pumps, pumping units powered by electrical motors on surface, coiled tubing equipment, wireline equipment, pumping equipment for pump down, remediation and drill out operations, nitrogen pumping equipment, gas compression equipment, pipeline pumping equipment etc.

The solid carbon that is produced can be used as a fuel source in direct carbon fuel cells (DCFC) for wellsite equipment. The solid carbon can also be used in the manufacture of carbon ion batteries for wellbore equipment. Carbon ion batteries are more reliable and have fewer safety concerns compared to other common batteries such as lithium batteries. The many advantages to the various embodiments disclosed is that green hydrogen can be produced in a more efficient method than water electrolysis, a more environmentally friendly alternative can be used instead of steam methane reforming—which produces $CO_2$ and CO as by-products, solid carbon is produced, and the green hydrogen and solid carbon can be used in fuel cells or for other applications.

An embodiment of the present disclosure is a method of supplying power to wellsite equipment comprising: (1) obtaining green hydrogen gas, solid carbon, or green hydrogen gas and solid carbon produced by: (A) introducing captured methane into a reaction chamber, wherein the reaction chamber contains a liquid base fluid, a plurality of carrier droplets, and a catalyst; and (B) allowing the captured methane to react with the catalyst in the reaction chamber to form the green hydrogen gas and solid carbon, wherein no carbon dioxide is produced as a by-product of the reaction of the captured methane and the catalyst; and (2) using the produced green hydrogen gas, the solid carbon, or the green hydrogen gas and the solid carbon to power the wellsite equipment. Optionally, the method further comprises wherein the methane is captured from produced gas of a subterranean formations during oil or gas production operations. Optionally, the method further comprises wherein the methane is captured from cattle or dairy farms or from landfills. Optionally, the method further comprises wherein the catalyst is a metal, a metal alloy, or a metal salt. Optionally, the method further comprises wherein the metal of the catalyst is selected from the group consisting of copper, nickel, cobalt, iron, manganese, chromium, vanadium, palladium, platinum, gold, silver, ruthenium, rhodium, iridium, aluminum, gallium, indium, thallium, tin, bismuth, and combinations thereof, and wherein the metal salt is selected from the group consisting of a metal chloride, metal fluoride, metal bromide, metal iodide, metal nitrate, metal triflate, silver chloride, silver fluoride, silver bromide, silver iodide, silver triflate, and combinations thereof. Optionally, the method further comprises wherein the catalyst is a plurality of solid particles. Optionally, the method further comprises wherein the plurality of solid particles has a mean particle size in the range of 10 to 100 nanometers.

Optionally, the method further comprises wherein the plurality of carrier droplets comprises a pure metal or a metal alloy comprising a post-transition metal selected from the group consisting of aluminum, gallium, indium, thallium, tin, bismuth, and combinations thereof. Optionally, the method further comprises wherein the post-transition metal is alloyed with an alkali metal, alkaline earth metal, actinide metal, lanthanide metal, transition metal, or combinations thereof. Optionally, the method further comprises wherein the plurality of carrier droplets has a mean diameter in the range of 0.1 to 50 micrometers. Optionally, the method further comprises wherein the plurality of carrier droplets comprises a metal that has a melting point below 150° C. Optionally, the method further comprises wherein the liquid base fluid is a non-polar solvent selected from alkanes, chloroform, carbon tetrachloride, diethyl ether, toluene, xylene, or 1,4-dioxane. Optionally, the method further comprises wherein the plurality of carrier droplets comprises a metal, and wherein the liquid base fluid has a temperature greater than or equal to a melting point of the metal. Optionally, the method further comprises wherein the liquid base fluid, the plurality of carrier droplets, and the catalyst are agitated within the reaction chamber, wherein the agitation is mechanical agitation, and wherein the mechanical agitation is continuously applied to contents in the reaction chamber during a reaction time. Optionally, the method further comprises more than one reaction chamber connected in series. Optionally, the method further comprises wherein the green hydrogen gas is used as a fuel in internal combustion engines of the wellsite equipment, as a power source in hydrogen fuel cells to produce electricity for the wellsite equipment, or to produce electricity from the hydrogen fuel cells to charge batteries to power the wellsite equipment. Optionally, the method further comprises wherein the solid carbon is used as a fuel source in direct carbon fuel cells or carbon ion batteries for the wellsite equipment. Optionally, the method further comprises wherein the wellsite equipment is used in hydraulic fracturing operations, drilling operations, or cementing operations.

Another embodiment of the present disclosure is a system for powering wellsite equipment comprising: wellsite equipment; captured methane; a liquid base fluid; a plurality of carrier droplets; a catalyst; a reaction chamber configured to: receive the captured methane, the liquid base fluid, the plurality of carrier droplets, and the catalyst; agitate the captured methane, the liquid base fluid, the plurality of carrier droplets, and the catalyst in the reaction chamber; and allow the captured methane to react with the catalyst in the reaction chamber to form green hydrogen gas and solid carbon, wherein no carbon dioxide is produced as a by-product of the reaction of the captured methane and the catalyst; a power source configured to supply the wellsite equipment with power, wherein the power source utilizes the green hydrogen gas or the solid carbon. Optionally, the system further comprises wherein the methane is captured from produced gas of a subterranean formations during oil or gas production operations. Optionally, the system further comprises wherein the methane is captured from cattle or dairy farms or from landfills. Optionally, the system further comprises wherein the catalyst is a metal, a metal alloy, or a metal salt. Optionally, the system further comprises wherein the metal of the catalyst is selected from the group consisting of copper, nickel, cobalt, iron, manganese, chromium, vanadium, palladium, platinum, gold, silver, ruthenium, rhodium, iridium, aluminum, gallium, indium, thallium, tin, bismuth, and combinations thereof, and wherein the metal salt is selected from the group consisting of a metal chloride, metal fluoride, metal bromide, metal iodide, metal nitrate, metal triflate, silver chloride, silver fluoride, silver bromide, silver iodide, silver triflate, and combinations thereof. Optionally, the system further comprises wherein the catalyst is a plurality of solid particles. Optionally, the system further comprises wherein the plurality of solid particles has a mean particle size in the range of 10 to 100 nanometers. Optionally, the system further comprises wherein the plurality of carrier droplets comprises a pure metal or a metal alloy comprising a post-transition metal selected from the group consisting of aluminum, gallium, indium, thallium, tin, bismuth, and combinations thereof. Optionally, the system further comprises wherein the post-transition metal is alloyed with an alkali metal, alkaline earth metal, actinide metal, lanthanide metal, transition metal, or combinations thereof. Optionally, the system further comprises wherein the plurality of carrier droplets has a mean diameter in the range of 0.1 to 50 micrometers. Optionally, the system further comprises wherein the plurality of carrier droplets comprises a metal that has a melting point below 150° C. Optionally, the system further comprises wherein the liquid base fluid is a non-polar solvent selected from alkanes, chloroform, carbon tetrachloride, diethyl ether, toluene, xylene, or 1,4-dioxane. Optionally, the system further comprises wherein the plurality of carrier droplets comprises a metal, and wherein the liquid base fluid has a temperature greater than or equal to a melting point of the metal. Optionally, the system further comprises wherein the liquid base fluid, the plurality of carrier droplets, and the catalyst are agitated within the reaction chamber, wherein the agitation is mechanical agitation, and wherein the mechanical agitation is continuously applied to contents in the reaction chamber during a reaction time. Optionally, the system further comprises more than one reaction chamber connected in series. Optionally, the system further comprises wherein the green hydrogen gas is used as a fuel in internal combustion engines of the wellsite equipment, as a power source in hydrogen fuel cells to produce electricity for the wellsite equipment, or to produce electricity from the hydrogen fuel cells to charge batteries to power the wellsite equipment. Optionally, the system further comprises wherein the solid carbon is used as a fuel source in direct carbon fuel cells or carbon ion batteries for the wellsite equipment. Optionally, the system further comprises wherein the wellsite equipment is used in hydraulic fracturing operations, drilling operations, or cementing operations.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps.

It should also be understood that, as used herein, "first," "second," and "third," are assigned arbitrarily and are merely intended to differentiate between two or more inlets, outlets, reaction chambers, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of supplying power to wellsite equipment comprising:
   (1) obtaining green hydrogen gas, solid carbon, or green hydrogen gas and solid carbon produced by:
      (A) introducing captured methane into a reaction chamber, wherein the reaction chamber contains a liquid base fluid, a plurality of carrier droplets, and a catalyst; and
      (B) allowing the captured methane to react with the catalyst in the reaction chamber to form the green hydrogen gas and solid carbon,
      wherein the liquid base fluid is a non-polar solvent, and wherein no carbon dioxide is produced as a by-product of the reaction of the captured methane and the catalyst; and
   (2) using the produced green hydrogen gas, the solid carbon, or the green hydrogen gas and the solid carbon to power the wellsite equipment.

2. The method according to claim 1, wherein the methane is captured from produced gas of a subterranean formations during oil or gas production operations.

3. The method according to claim 1, wherein the methane is captured from cattle or dairy farms or from landfills.

4. The method according to claim 1, wherein the catalyst is a metal, a metal alloy, or a metal salt.

5. The method according to claim 4, wherein the metal of the catalyst is selected from the group consisting of copper, nickel, cobalt, iron, manganese, chromium, vanadium, palladium, platinum, gold, silver, ruthenium, rhodium, iridium, aluminum, gallium, indium, thallium, tin, bismuth, and combinations thereof, and wherein the metal salt is selected from the group consisting of a metal chloride, metal fluoride, metal bromide, metal iodide, metal nitrate, metal triflate, silver chloride, silver fluoride, silver bromide, silver iodide, silver triflate, and combinations thereof.

6. The method according to claim 1, wherein the catalyst is a plurality of solid particles.

7. The method according to claim 6, wherein the plurality of solid particles has a mean particle size in the range of 10 to 100 nanometers.

8. The method according to claim 1, wherein the plurality of carrier droplets comprises a pure metal or a metal alloy comprising a post-transition metal selected from the group consisting of aluminum, gallium, indium, thallium, tin, bismuth, and combinations thereof.

9. The method according to claim 8, wherein the post-transition metal is alloyed with an alkali metal, alkaline earth metal, actinide metal, lanthanide metal, transition metal, or combinations thereof.

10. The method according to claim 1, wherein the plurality of carrier droplets has a mean diameter in the range of 0.1 to 50 micrometers.

11. The method according to claim 1, wherein the plurality of carrier droplets comprises a metal that has a melting point below 150° C.

12. The method according to claim 1, wherein the liquid base fluid is selected from alkanes, chloroform, carbon tetrachloride, diethyl ether, toluene, xylene, or 1,4-dioxane.

13. The method according to claim 1, wherein the plurality of carrier droplets comprises a metal, and wherein the liquid base fluid has a temperature greater than or equal to a melting point of the metal.

14. The method according to claim 1, wherein the liquid base fluid, the plurality of carrier droplets, and the catalyst are agitated within the reaction chamber, wherein the agitation is mechanical agitation, and wherein the mechanical agitation is continuously applied to contents in the reaction chamber during a reaction time.

15. The method according to claim 1, further comprising more than one reaction chamber connected in series.

16. The method according to claim 1, wherein the green hydrogen gas is used as a fuel in internal combustion engines of the wellsite equipment, as a power source in hydrogen fuel cells to produce electricity for the wellsite equipment, or to produce electricity from the hydrogen fuel cells to charge batteries to power the wellsite equipment.

17. The method according to claim 1, wherein the solid carbon is used as a fuel source in direct carbon fuel cells or carbon ion batteries for the wellsite equipment.

18. The method according to claim 1, wherein the wellsite equipment is used in hydraulic fracturing operations, drilling operations, or cementing operations.

19. A system for powering wellsite equipment comprising:
   well site equipment;
   captured methane;
   a liquid base fluid, wherein the liquid base fluid is a non-polar solvent;
   a plurality of carrier droplets;
   a catalyst;
   a reaction chamber configured to:
      receive the captured methane, the liquid base fluid, the plurality of carrier droplets, and the catalyst;
      agitate the captured methane, the liquid base fluid, the plurality of carrier droplets, and the catalyst in the reaction chamber; and
      allow the captured methane to react with the catalyst in the reaction chamber to form green hydrogen gas and solid carbon, wherein no carbon dioxide is produced as a by-product of the reaction of the captured methane and the catalyst; and
   a power source configured to supply the wellsite equipment with power, wherein the power source utilizes the green hydrogen gas or the solid carbon.

20. The system according to claim 19, wherein the wellsite equipment is used in hydraulic fracturing operations, drilling operations, or cementing operations.

\* \* \* \* \*